(12) United States Patent
Bykov et al.

(10) Patent No.: US 7,975,916 B2
(45) Date of Patent: Jul. 12, 2011

(54) SECURING PAYMENT DATA

(75) Inventors: Sergey Bykov, Redmond, WA (US); Charles J. Williams, Redmond, WA (US); Craig Jensen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 12/272,058

(22) Filed: Nov. 17, 2008

(65) Prior Publication Data
US 2009/0083189 A1    Mar. 26, 2009

Related U.S. Application Data

(62) Division of application No. 11/556,317, filed on Nov. 3, 2006, now Pat. No. 7,451,926.

(51) Int. Cl.
*G06K 15/00* (2006.01)

(52) U.S. Cl. ........ 235/383; 235/375; 235/380; 235/382; 235/382.5; 235/451; 235/487; 235/492; 705/50; 705/51; 705/64; 705/65; 705/66; 705/67; 705/75

(58) Field of Classification Search .................. 235/379, 235/380, 382.5, 487, 451, 492; 705/50, 64, 705/75
See application file for complete search history.

(56) References Cited

U.S. PATENT DOCUMENTS

| | | | |
|---|---|---|---|
| 4,731,842 A | 3/1988 | Smith | |
| 6,234,389 B1 | 5/2001 | Valliani et al. | |
| 6,253,027 B1 | 6/2001 | Weber et al. | |
| 6,304,915 B1 | 10/2001 | Nguyen et al. | |
| 6,312,175 B1 | 11/2001 | Lum | |
| 6,373,950 B1 | 4/2002 | Rowney | |
| 6,385,723 B1 | 5/2002 | Richards | |
| 6,442,448 B1 | 8/2002 | Finley et al. | |
| 6,736,313 B1 | 5/2004 | Dickson | |
| 7,103,575 B1 | 9/2006 | Linehan | |
| 7,309,012 B2 | 12/2007 | Von Mueller et al. | |
| 2001/0034717 A1 | 10/2001 | Whitworth | |
| 2002/0069114 A1 | 6/2002 | Charette et al. | |
| 2002/0103763 A1 | 8/2002 | Schutz | |
| 2002/0123970 A1 | 9/2002 | Ludtke et al. | |

(Continued)

FOREIGN PATENT DOCUMENTS

| | | |
|---|---|---|
| EP | 0930590 A1 | 2/1999 |
| EP | 1233589 A3 | 8/2002 |

OTHER PUBLICATIONS

Yang, et al. "Interoperation Support for Electronic Business" (2000) ACM vol. 43, No. 6, 9 pages.

(Continued)

*Primary Examiner* — Thien M. Le
*Assistant Examiner* — Tuyen K Vo
(74) *Attorney, Agent, or Firm* — Turocy & Watson, LLP

(57) ABSTRACT

The claimed subject matter relates to an architecture or arrangement that can limit access to sensitive information by means of encryption. In particular, data obtained from a payment instrument at, e.g., a Point-Of-Sale (POS) location can be encrypted at an early stage such that a POS (or another) application does not have access to the data in an unencrypted form and/or does not have access to a means for decrypting the data. For example, a Public Key Infrastructure (PKI) arrangement can be employed such that a back-end payment processor can define encryption algorithms, associate itself with a public key, and maintain a private key for decryption. The public key can be delivered to the POS location and employed for data encryption, and, moreover, the PKI can be regulated by the more trusted parties.

14 Claims, 14 Drawing Sheets

U.S. PATENT DOCUMENTS

| | | |
|---|---|---|
| 2004/0124966 A1 | 7/2004 | Forrest |
| 2005/0033692 A1 | 2/2005 | Jarman et al. |
| 2005/0251469 A1 | 11/2005 | Nandakumar |
| 2005/0256806 A1 | 11/2005 | Tien et al. |
| 2006/0106717 A1 | 5/2006 | Randle et al. |
| 2008/0040284 A1* | 2/2008 | Hazel et al. ............... 705/64 |

OTHER PUBLICATIONS

Hall, et al. "WPP: A Secure Payment Protocol for Supporting Credit-And Debit Card Transactions Over Wireless Networks" (2001) IEEE International Conference on Telecommunications, 6 pages.

Zhang, et al. "The Secure and Multiple Payment System Based on the Mobile Phone Platform" (2004) Proceedings to be published by Springer Verlag in its Lecture Notes in Computer Series, 15 pages.

International Search Report for International Patent Application No. PCT/US2007/083551 dated Feb. 27, 2008, 3 pages.

OA dated Jun. 12, 2007 for U.S. Appl. No. 11/556,317, 14 pages.

OA dated Nov. 27, 2007 for U.S. Appl. No. 11/556,317, 9 pages.

OA dated Mar. 19, 2008 for U.S. Appl. No. 11/556,317, 15 pages.

* cited by examiner

SECURING PAYMENT DATA

CROSS REFERENCE TO RELATED APPLICATIONS

This application is a divisional of U.S. patent application Ser. No. 11/556,317, filed on Nov. 3, 2006, entitled "SECURING PAYMENT DATA", the entirety of which is incorporated herein by reference.

BACKGROUND OF THE INVENTION

With the widespread growth of non-cash transactions in recent times, consumers are increasingly relying upon various non-cash payment instruments such as credit cards, debit cards, contactless cards or another type of payment/transaction card, as well as traditional checks or other negotiable instruments in order to complete transactions at point-of-sale (POS) locations. As the use of these payment instruments have increased, associated adverse behavior such as fraud and so called "identity theft" has increased even more dramatically. Recently, it has been estimated that identity theft is the fastest growing crime in many countries worldwide.

One of the primary gateways for identity theft or other fraudulent behavior occurs with respect to POS applications because these applications are often responsible for initiating a transaction request to a back-end payment processor. Thus, the POS applications generally have access to personal and/or other sensitive information such as credit/debit card numbers or the like. Accordingly, one of the biggest issues in, e.g., the retail industry today is the fact that POS applications have access to payment instrument data without much in the way of security and are thus one of the major sources from which such data is illegally obtained, either by hackers or employees of the POS location.

A typical POS application reads data from payment card's magnetic tracks by means of a Magnetic Stripe Reader device (MSR). This data often includes much sensitive information such as the card number, expiration date, cardholder's name, etc. The application sends the data to the payment service provider to charge or authorize a payment. Typically, the application has full control over the data: it can store it in database or handle it in any other way. Consequently, many credit card networks such as Visa and MasterCard prohibit storing of card information; however, there is conventionally no way to enforce this policy. Today, most of the leaks of sensitive data happen not from POS applications intentionally revealing the data but from those applications simply mishandling the data and unintentionally exposing it to hackers or the like, generally due to a lack of secure programming expertise on the part of the application developers. Handling sensitive data in the secure manner is often a challenge even for programmers trained in the field.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can facilitate isolating data obtained from a payment instrument from a Point-Of-Sale (POS) application as well as other applications of a POS front-end. In accordance therewith, the architecture can include a front-end interface configured to attach to or embed within one or more POS components such as a POS input device, a POS service object, POS middleware, or the like. The front-end interface can capture data obtained from a payment instrument and forward the data to a security component that encrypts the data.

In accordance with one aspect of the claimed subject matter, the security component can encrypt the data in accordance with a Public Key Infrastructure (PKI) arrangement. For example, the data can be encrypted by way of a public key associated with a payment processor (or another financial institution, association, or agency), or by some other means. Based upon the foregoing, the sensitive data obtained from a payment instrument can be securely encrypted as soon as is feasible from the beginning of a transaction, and remain secured until the data reaches a payment back-end.

In accordance with one aspect, the payment back-end can include a back-end interface configured to attach to or embed within a payment component, such as payment middleware, a payment processor, the payment processor, or the like. The back-end interface can also be operatively coupled to a decryption component that decrypts the data intercepted by the back-end interface. The decryption component can, e.g., house the public key as well as facilitate the transmission of the public key to the front-end. The decryption component can also store a private key associated with the public key in order to decrypt the data. Accordingly, regulation of the keys and other aspects of the PKI can be managed by more trusted (and more secure) parties of a given transaction.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DESCRIPTION OF THE INVENTION

Figure 1:
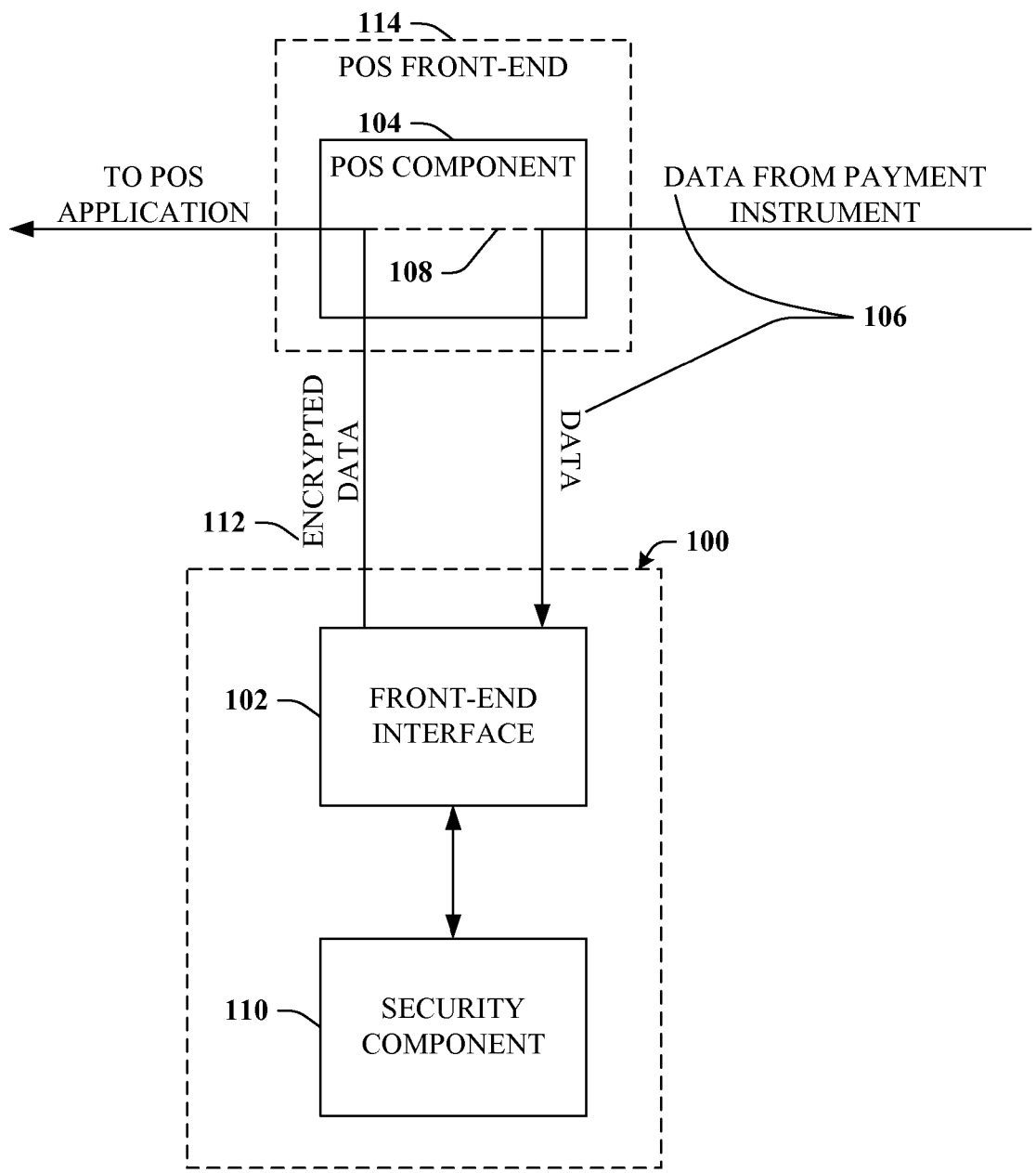
FIG. 1 is a block diagram of a front-end system that can facilitate a more secure Point-Of-Sale (POS) transaction environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

With reference now to the drawings, referring initially to FIG. 1, a front-end system 100 that can facilitate a more secure Point-Of-Sale (POS) transaction environment is depicted. Generally, the system 100 can include a front-end interface 102 that can be configured to attach to (and/or be embedded in) a POS component 104. The front-end interface 102 can intercept data 106 obtained from a payment instrument (not shown) as it is received at the POS component 104. For example, the data 106, which might otherwise traverse the POS component 104 as indicated by the broken lines at reference numeral 108, can instead be intercepted by the front-end interface 102. The data 106 can then be delivered to a security component 110, which can encrypt the data 106 to generate encrypted data 112. The encrypted data 112 can then be output to other POS components (not shown) in a POS front-end 114 and/or be output to a POS application (not shown).

As illustrated, the POS front-end 114 can include the POS component 104; however, it is to be understood that the POS front-end 114 can include many POS components 104, each with distinguishing characteristics. Example POS components 104 will be discussed in greater detail infra with reference to FIGS. 2 and 3, but it should be appreciated that the POS component(s) 104 can be either hardware, software, or a combination thereof implemented to obtain and/or process data 106, e.g., at a point-of-sale location. Accordingly, by way of explanation and not limitation, the POS front-end 114 and/or some or all of the POS components 104 can reside at a check-out register of a retail establishment or a computer or server for the retail establishment. Additionally or alternatively, the POS component(s) 104 can reside in a vending machine, a payphone, a transit system station such as a turnstile, kiosk, toll both, etc., or substantially any device in which data 106 from a payment instrument can be received.

According to an aspect, one feature of the claimed subject matter is, in essence, to mitigate unsecured exposure of the data 106 to the POS application and/or other potentially unsafe applications or components. In particular, these applications generally represent a primary source for mishandling of sensitive data and/or are a primary target for hackers and malicious code directed toward fraud, identity theft, or the like. Hence, the front-end interface 102 can intercept the data 106 before the data 106 can be passed to the POS application. The security component 110 can then encrypt the data 106 such that the POS application (or other applications) need not ever be in receipt of the data 106, but rather be in receipt of the encrypted data 112 instead. The encrypted data 112 can then be decrypted after leaving the control of the POS application, typically at a payment back-end (not shown), which is detailed more thoroughly with reference to FIGS. 5 and 6. In accordance therewith, the likelihood that the POS (or another) application will mishandle sensitive data (e.g., data 106) can be substantially reduced.

Since the POS application is generally closely associated with the POS front-end 114 and/or the POS component(s) 104, it is often not advisable for the security component 110 to encrypt the data 106 according to a password/code/key or encryption scheme known, stored, and/or devised at the POS front-end 114. Otherwise, the encrypted data 112 handled by the POS application can potentially be decrypted if the password or other means should be compromised, thereby undermining some of the effectiveness of a more secure POS transaction environment. Moreover, the encrypted data 112 must ultimately be decrypted at some point after traversing the POS application (again, typically at a payment back-end). Hence, the ability to decrypt the encrypted data 112 should be available to the payment back-end but should not be available to (or accessible by) other unintended applications or components.

Therefore, in accordance with one aspect of the claimed subject matter, a Public Key Infrastructure (PKI) can be employed to mitigate the aforementioned issues. In general, a PKI is a well-known arrangement that can allow a party to inspect and authenticate user identities. PKI can also allow for binding of public keys to particular users, usually carried out by software at a central location together with other coordinated software at distributed locations. The public keys are typically included in certificates. PKI arrangements can, for example, enable users to be authenticated to one another. In addition, the information included in an identity certificate (e.g., one of the public keys) can be employed to encrypt and authenticate messages transmitted between users.

In general, a PKI can consist of client software, server software such as a certificate authority, hardware (e.g., smartcards), and operational procedures. A first user may digitally sign messages using a private key, and a second user can check that signature (e.g., by using the public key contained in the first user's certificate issued by a certificate authority within the PKI). This can enable two (or more) communicating parties to establish confidentiality, message integrity and user authentication without having to exchange any secret information in advance.

In accordance therewith, the POS component 104 can receive a public key associated with, e.g., a payment back-end component with the PKI defined by a financial institution, a financial association, a payment processor, or the like. The public key can be provided to the security component 110 and employed to create the encrypted data 112 such that only the trusted back-end component can decrypt the encrypted data 112 (e.g., with a private key). Therefore, neither sensitive data 106 associated with a payment instrument nor the tools to decode this information need be accessible by the POS application or other unsafe components or third parties. Moreover, many relevant features of the encryption scheme can be defined by the most trusted participants involved (e.g., the financial institutions, associations, etc.).

Figure 2:
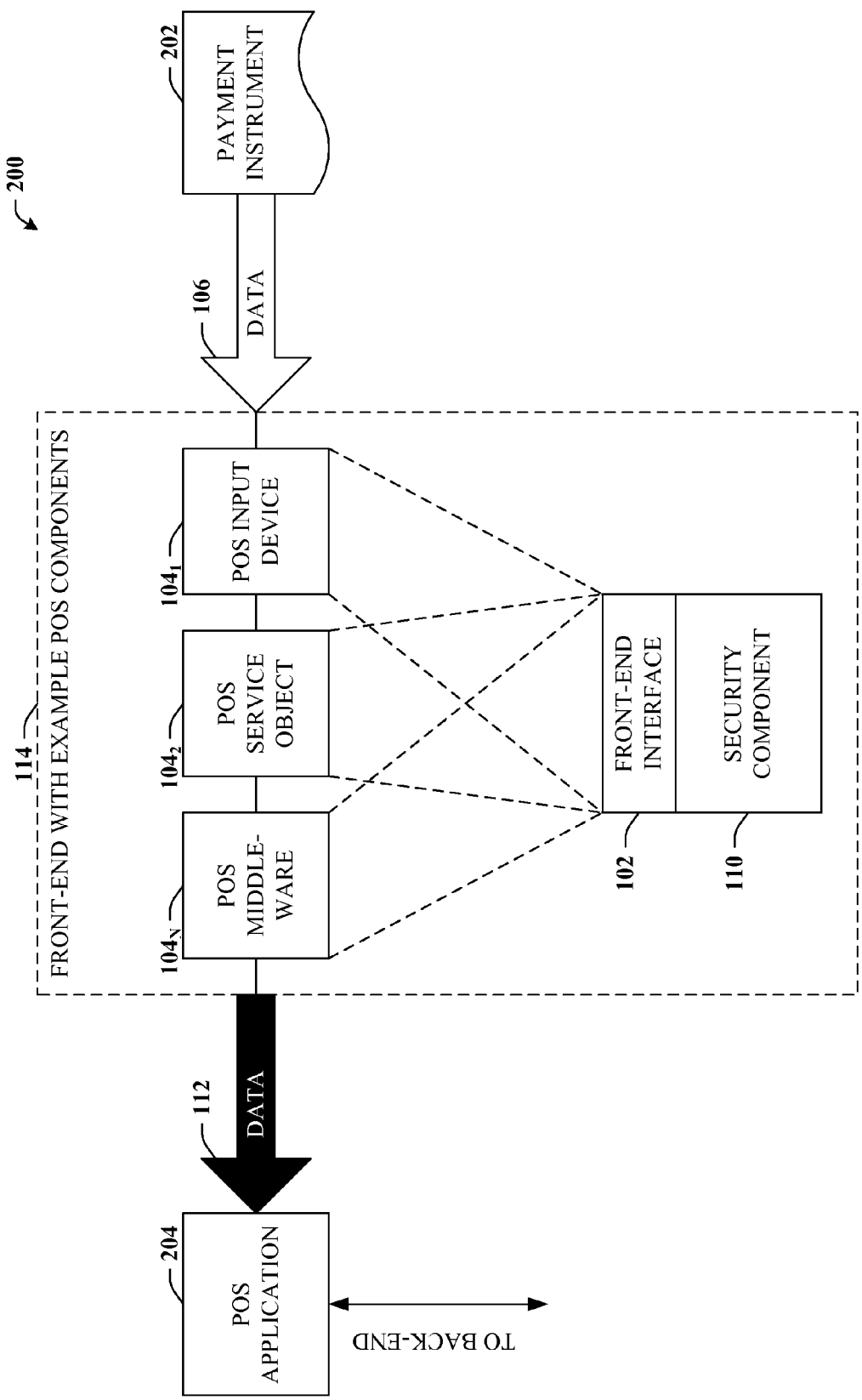
FIG. 2 is an exemplary system comprising a front-end that includes example POS components that can facilitate a more secure POS transaction environment.

With reference now to FIG. 2, system 200 with a front-end that includes example POS components that can facilitate a more secure POS transaction environment is illustrated. As detailed previously, the front-end 114 can be, e.g., a point-of-sale counter at a retail establishment (or another configuration) and can include a wide variety of POS components 104 that can be referred to herein either individually or collectively as POS components 104, or specifically referenced and called out according to particular characteristic as in POS input device 1041, POS service object 1042, POS middleware 104N, etc. It is to be appreciated that not all the example POS components 104 need exist and that other POS components 104 can be present in addition to or alternatively to those depicted in FIG. 2, and the POS components 104 can exist in different configurations that what is shown.

By way of illustration and not limitation, conventional point-of-sale front-ends (e.g., retail checkout counter/kiosk) include a POS input device 1041 that, e.g., physically reads or otherwise obtains the data 106 from the payment instrument 202. In accordance with one aspect, the payment instrument 202 can be a credit card and the POS input device 1041 can be a Magnetic Stripe Reader (MSR) device, however, other aspects can exist, many of which are presented infra with reference to FIGS. 3 and 4. Returning to the conventional point-of-sale front end to better provide context for the claimed subject matter, the MSR device (e.g., POS input device 1041) can then pass the magnetic track data (e.g., data 106) to an associated MSR service object (e.g., POS service object 1042) that can decode and/or format the raw magnetic track data and transmit the decoded data to the POS application 204. Typically, the POS application 204 can then send a payment request along with the credit card information to a payment back-end.

However, since one object of the claimed subject matter can be to limit the POS application 204 from attaining access to the data 106, the system 200 can include the front-end interface 102 that can be embedded in or attached to one or more of the POS components 104. In accordance therewith, the front-end interface 102 can intercept data 106 obtained from the payment instrument 202; and the security component 110 can encrypt the data 106 to generate encrypted data 112. Ideally, the front-end interface 102 can be operatively attached to the POS input device 1041 (e.g., the MSR device) as this device is typically the first POS component 104 to gain access to data 106 obtained from the payment instrument 202. In that case, the data 106 can be encrypted (to create encrypted data 112) virtually as soon as it is received from the payment instrument 202.

Yet it should be appreciated that another object of the claimed subject matter can be to provide many of the features described herein with respect to existing hardware such that implementation of, e.g., encryption of data 106 can be achieved with substantially minimal modification to the hardware or software of existing point-of-sale front-ends. Accordingly, in some cases, existing POS input devices 1041 may not be capable of supporting the front-end interface 102 and/or the security component 110. In such cases, the front-end interface 102 can be introduced into one of the other POS components 104, such as the POS service object 1042.

Since the POS service object 1042 is typically comprised of software code executed on a processor or controller, implementing the front-end interface 102 in the POS service object 1042 can be a more cost effective solution to help ensure that the POS application 204 is privy to encrypted data 112 rather than the data 106. However, in the case where it is not possible or infeasible to implement the front-end interface 102 (and/or the associated security component 110) on either one of the POS input device 1041 or the POS service object 1042, then POS middleware 104N can be employed. That is, the front-end interface 102 can be employed with the POS middleware 104N in order to encrypt data 106 before it can reach the POS application 204.

Middleware is well-known in the computing field and can be described as a communications layer that allows applications and/or components to interact across disparate hardware and network environments. Accordingly, the POS middleware 104N can be a generic middleware component as well as middleware especially designed for or directed toward POS devices, components, and/or transactions.

Figure 3:
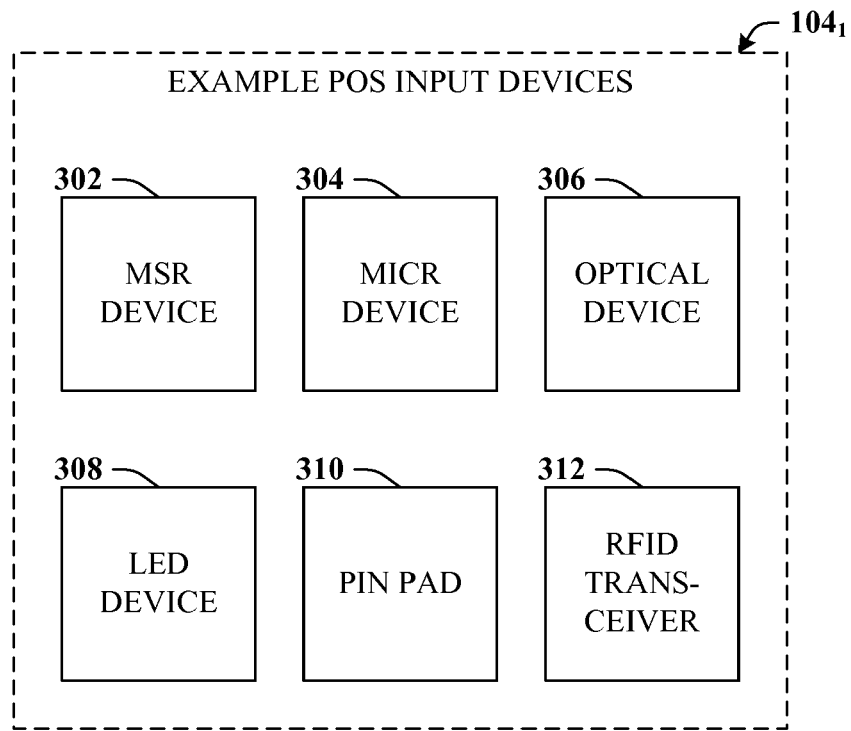
FIG. 3 is a block diagram of example POS input devices at a POS front-end.
Figure 4:
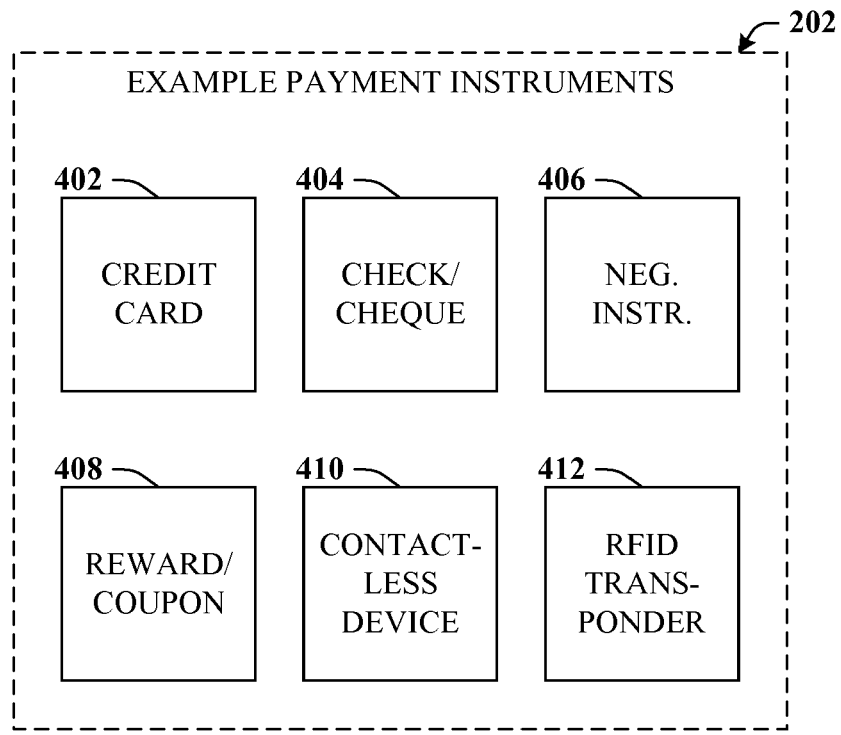
FIG. 4 depicts a block diagram of example payment instruments commonly employed at a POS front-end.

FIGS. 3 and 4 relate to example POS input devices, and example payment instruments, respectively. For example, FIG. 3 illustrates a block diagram of example POS input devices 1041, while FIG. 4 depicts a block diagram of example payment instruments 202. It is to be appreciated that FIGS. 2 and 3 are intended to aid in understanding, but not intended to be limiting. Other POS input devices 1041 and/or payment instruments 202 other than those specifically called out herein can exist and be included within the scope and spirit of this description and the claims appended hereto. As detailed supra, for instance in connection with FIG. 2, the POS input device 1041 can be a MSR device 302. A MSR device 302 can be a device that reads account information, etc. from the magnetic stripe of, e.g., a credit card 402, a debit card, charge card (or another payment instrument 202) in order to process a transaction. MSR device 302 can be either integrated into or attached onto a POS register (not shown) as a separate component; or implemented as part of a stand-alone terminal dedicated to the function of processing credit cards 402, or another payment instrument 202 that includes a magnetic stripe such as a gift certificate card or the like.

In addition, the POS input devices 1041 can be a Magnetic Ink Character Recognition (MICR) device 304 or another type of optical device 306. Optical devices (e.g., 304, 306) can be employed in connection with character recognition applications in order to determine particular information such as account number, routing number, or other information associated with a payment instrument 202 such as a check 404 or other negotiable instrument 406. In the case of a MICR device (e.g., MICR device 304), the device can be configured to read special characters often printed with special ink in accordance with standards adopted by banking industries. These special characters typically reside at the bottom of a check 404 or other negotiable instrument 406 printed in a particular font (e.g., E-13B, CMC-7, or the like). In accordance therewith, the MICR device 304 can process checks 404 more efficiently and with fewer errors than more general optical devices 306.

Another example of the POS input devices 1041 is a Light-Emitting Diode (LED) device 308 such as a barcode or similar type light-based reader such as a laser scanner. LED device 308 can be employed to read rewards coupons 408 or the like, such as electronic offers presented to (and printed by) account holders. Moreover, the POS input devices 1041 can be a Personal Identification Number (PIN) pad 310 employed to verify additional identification information such as an account holder's PIN. PIN pad 310 can be employed, e.g., in connection with credit/charge debit cards 402 or a similar payment instrument 202.

The POS input devices 1041 can also be a Radio Frequency Identification (RFID) transceiver 312. RFID transceiver 312 can be employed in connection with a "contactless" card or device 410 or another type of device with an RFID "tag" or transponder 412. RFID transceiver 312 can receive data (e.g., account information, etc.) from smart cards and are especially prevalent in mass transit systems in order to facilitate more rapid transactions.

Figure 5:
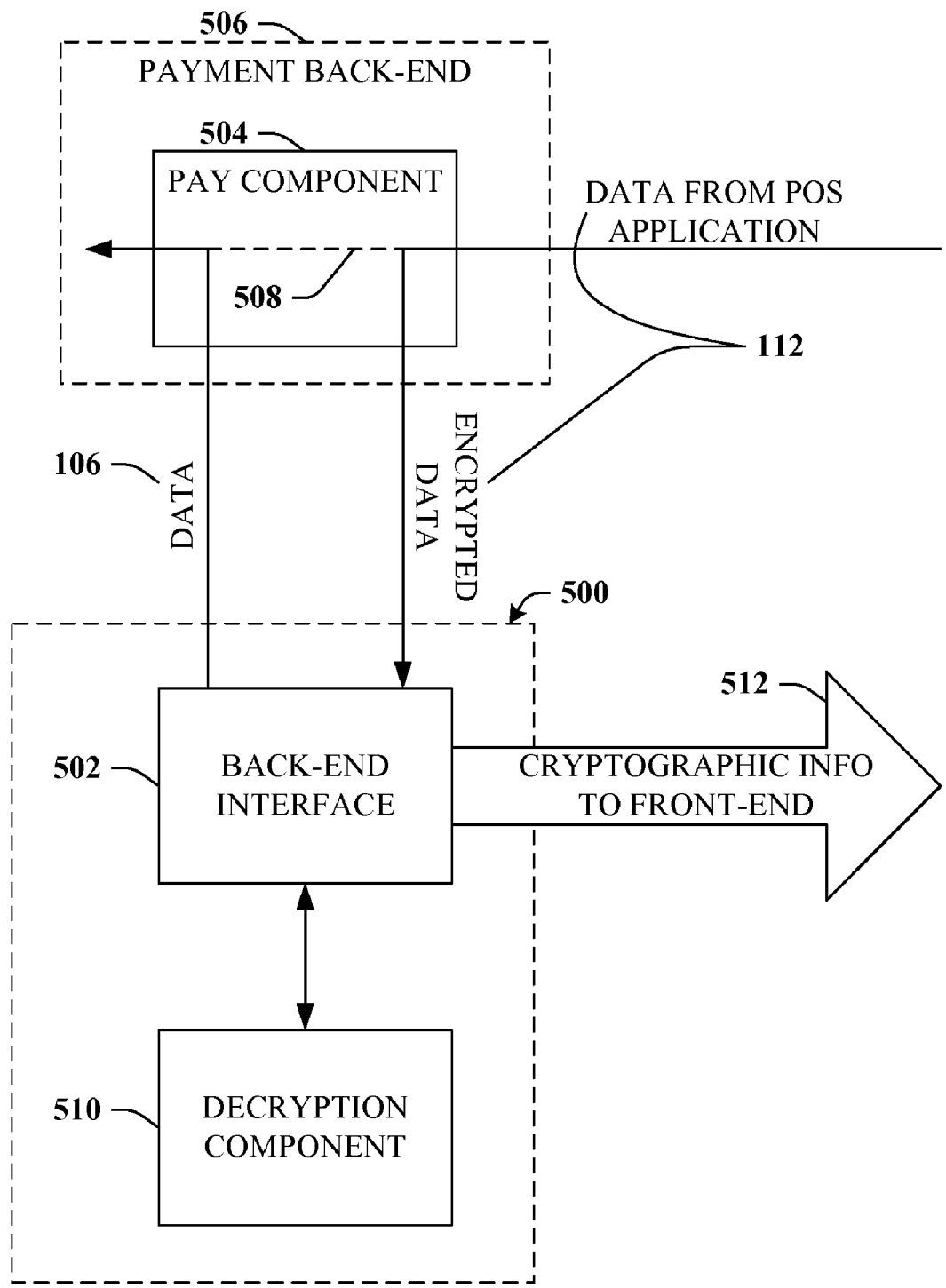
FIG. 5 depicts a block diagram of a back-end system that can facilitate a more secure transaction processing environment.

Turning briefly to FIG. 5, a back-end system 500 that can facilitate a more secure transaction processing environment is displayed. Generally, the system 500 can include a back-end interface 502 that can be configured to attach (or embed within) a payment component 504 that, e.g., resides in a payment back-end 506. The payment back-end 506 can include a computer or server corresponding to, e.g., a credit card issuer, a bank or the like, or another financial institution associated with a payment instrument. For the sake of illustration only, a conventional payment back-end system is configured to receive data from a POS application (e.g., as detailed in connection with the POS application 204 with reference to FIG. 2). Thus, the data (which conventionally is not encrypted) would enter the payment back-end 506 and be processed by the one or more payment components 504, as depicted by the broken lines at reference numeral 508. However, if the payment back-end 506 is a recipient of encrypted data 112, such as an output from the POS front-end 114 of FIGS. 1 and 2, then the payment back-end 506 should be endowed with the ability to process and/or decrypt the encrypted data 112.

In accordance therewith, the back-end interface 502 can intercept the encrypted data 112 and a decryption component 510 can decrypt the encrypted data 112, thereby allowing unencrypted data 106 to be delivered to the payment component 504 or another payment component (not shown) within the payment back-end 506. As such, the encryption scheme employed (e.g., at the POS front-end 114 of FIGS. 1, 2) can be defined at the payment back-end 506 and/or by the system 500. Thus, cryptographic information 512 can be supplied to the POS front-end in advance, or upon a request from the POS front-end such as just prior to or during a transaction at a POS.

Figure 6:
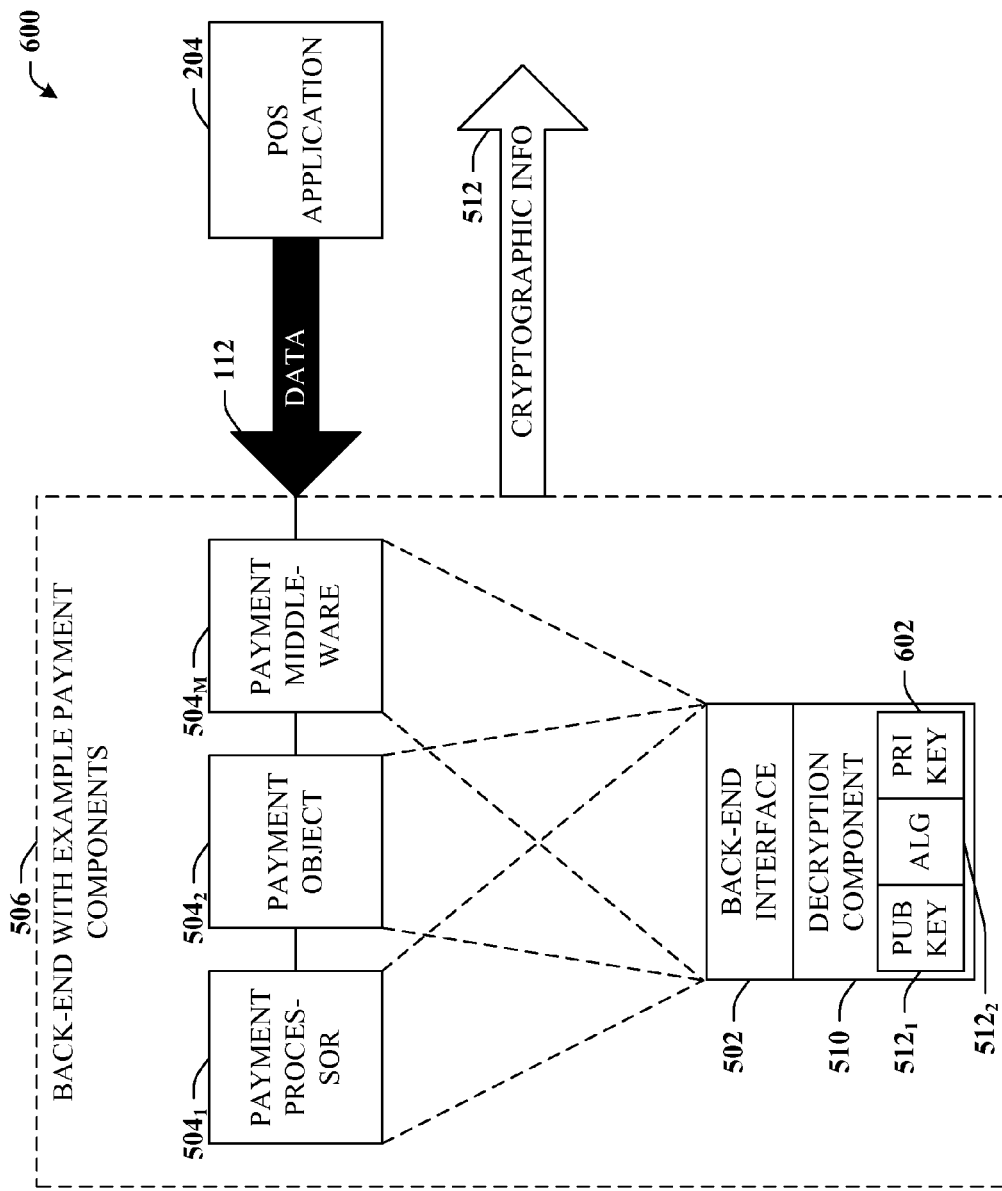
FIG. 6 illustrates a block diagram of a system with a back-end that includes example payment components that can facilitate a more secure transaction processing environment.

With reference now to FIG. 6, system 600 with a back-end that includes example payment components that can facilitate a more secure transaction processing environment is illustrated. In general, the payment back-end 506 can transmit cryptographic information 512 by way of a Wide Area Network (WAN) such as the Internet or the like to a remote third party. The cryptographic information 512 can be securely stored in the decryption component 510 (and/or in one or more payment components 5041-504M), and can be associated with the PKI described supra with reference to FIG. 1. For example, the cryptographic information 512 can include, e.g., a public key 5121 as well as a cryptographic algorithm 5122.

The cryptographic information 512 can be defined by the payment back-end 504 (or component thereof) or another financial institution and/or by a regulatory committee or standards board or another financial association. As such, the PKI (and the cryptographic information 512) can be established by more trusted or reliable parties than a POS vendor or other party where a transaction is likely to occur. Moreover, the equipment used either at a front-end or a back-end can be certified and/or approved by the aforementioned financial associations or institutions potentially leading to a higher level of payment data security and trust for payment processors, issuing and acquiring banks and card association, and can simplify data security compliance certification of POS applications and solutions as one aspect of those applications and solutions can be guaranteed by a platform.

In accordance with the foregoing, the payment back-end 506 can receive encrypted data 112 from the POS application 204. Typically, the encrypted data 112 can be salient and/or sensitive data obtained from a payment instrument as substantially described above and encrypted by utilizing the cryptographic information 512. The encrypted data 112 can be passed to one of the example payment components 5041-504M, some or all of which can be present in the payment back-end 506. The back-end interface 502 can be operatively attached or embedded within one or more of the payment components 5041-504M, and can intercept encrypted data 112.

For example, the back-end interface 502 (as well as the decryption component 510) can be coupled to the payment processor 5041. In that case, the decryption component 510 can decrypt the encrypted data 112, e.g., by utilizing a private key 602 associated with the public key 5121 as the underlying transaction is processed by the principal financial institution associated with a payment instrument. In the case where the payment processor 5041 is incapable of supporting the decryption of encrypted data 112 and/or such would require too much modification to a back-end system, then the decryption can be performed at the payment object 5042. In addition, as with the case of POS middleware 104N detailed in connection with FIG. 2, the payment back-end 506 can also employ middleware, such as payment middleware 504M, in order to, e.g., decrypt encrypted data 112.

Figure 7:
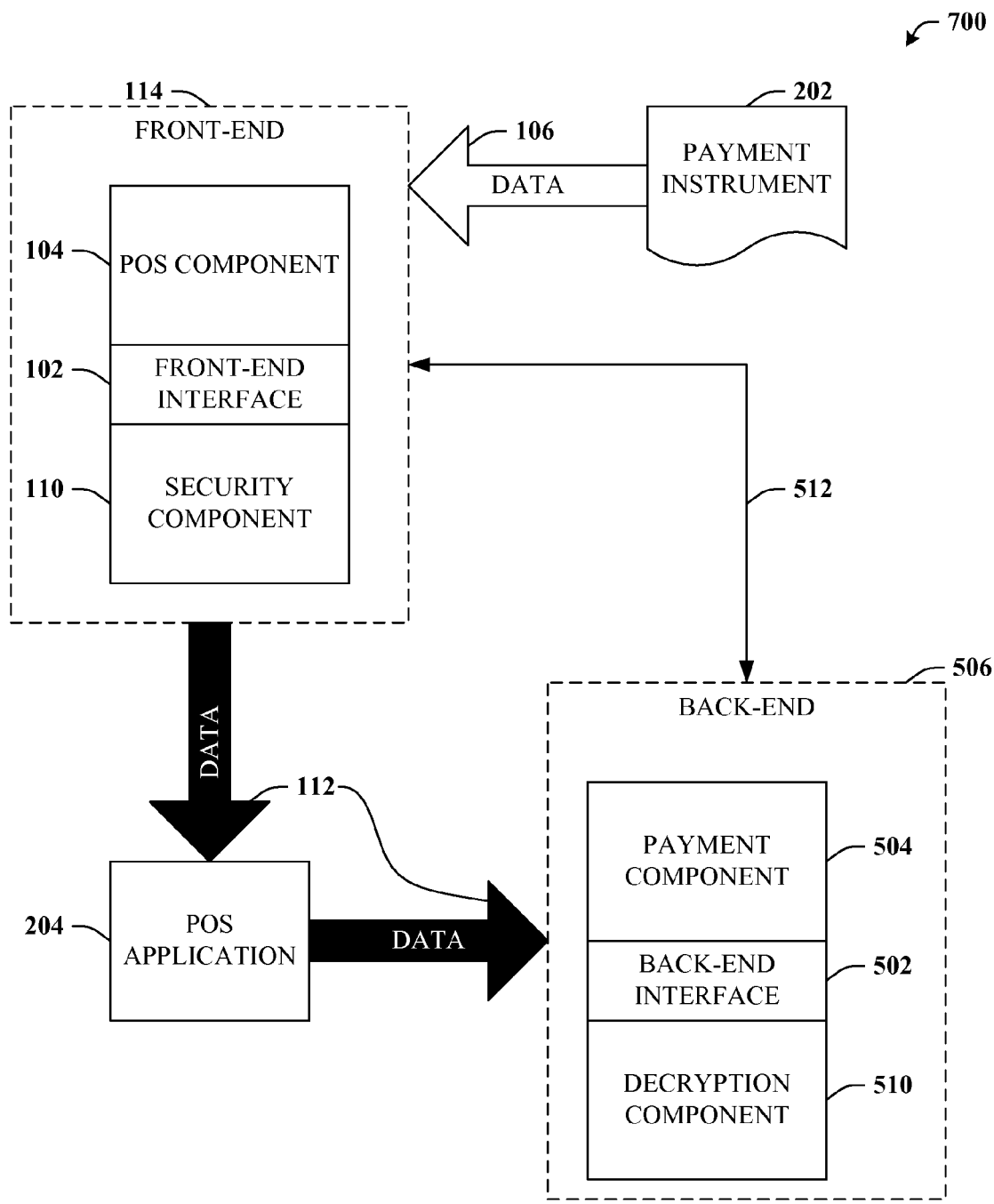
FIG. 7 illustrates a block diagram of a system 700 that can facilitate end-to-end encryption of POS transaction information.

FIG. 7 illustrates a block diagram of a system 700 that can facilitate end-to-end encryption of POS transaction information. System 700 is provided in order to illustrate an example embodiment in which many of the aspects of the claimed subject matter are depicted simultaneously and can be interacting in unison. As shown, the payment back-end 506, which can include one or more payment components 504 to which a back-end interface 502 and a decryption component 510 can be attached, can transmit cryptographic information 512 (e.g., a public key, etc.) to the POS front-end 114 (or a component therein). The POS front-end 114 can also received data 106 obtained from a payment instrument 202.

For example, the POS component 104 can be a MSR device that scans the magnetic stripe of the payment instrument 202 (e.g., a credit card). The front-end interface 102 can be attached to the MSR device (or another POS component 104) and can intercept the data 106. The security component 110 can create encrypted data 112 from the unencrypted data 106, e.g., by employing the public key, or other cryptographic information 512. Ultimately, in some cases after first traversing other POS components 104 such as a POS service object, the encrypted data 112 can be transmitted to the POS application 204, after which the encrypted data 112 can be forwarded to the payment back-end 506.

It is to be appreciated that the POS application 204 (as well as other potentially unsafe application) need not ever have access to unencrypted data 106. Rather, the encrypted data 112 can be decrypted by the decryption component 510 as the encrypted data 112 is received at one of the payment components 504. It is also to be appreciated that a range of possible implementation options is available. As one example, the data 106 can be encrypted in the reading hardware (e.g., a POS input device). In accordance with another example, the encryption of data 106 can be entirely software based such as in a POS service object, POS middleware, or another POS component 104. If the encryption functionality is built into the hardware such as an MSR device or other POS input device, and decryption is performed by the payment processor, potentially only encrypted data would flow through the software stack on the POS front-end 114.

It is to be further appreciated that the encryption performed by the security component 110 has been, for the sake of consistency and understanding, described herein as accomplished by way of, e.g., an asymmetric PKI public key or certificate, other arrangements can exist either alternatively or in addition to. For example, one variation could include encrypting data 106 with a single use symmetric key, and then passing the symmetric key encrypted by an asymmetric public key along with data. Cryptographic algorithm(s), key length and/or other parameters of cryptographic information 512 can be predefined by the solution, or specified by the payment processor, payment object, or another payment component 504, as well as by a third party agency or association.

Furthermore, as indicated supra, one object of the claimed subject matter can be to isolate the POS application 204 from unencrypted data 106. In accordance therewith, the POS front-end 114 and the payment back-end 506 have been largely described herein as being exclusive of the POS application 204. For example, data 106 can be encrypted at the POS front-end 114, pass through the POS application 204 as encrypted data 112, then be decrypted at the payment back-end 506. However, in certain situations, either one or both of the POS front-end 114 and the payment back-end 506 can include aspects of the POS application 204. For instance, some vendors implement POS service objects and/or POS middleware as, e.g., external modules and/or external libraries loaded by the POS application 204. Likewise, payment objects and/or payment middleware can also be implemented by the POS application 204 in a similar manner. As such, in these cases and for the sake of a more comprehensive understanding, it should be called out that front-end interface 102 and/or security component 110 can exist as an (or part of an) external module (etc.) of the POS application 204. Similarly, the same goes for the back-end interface 502 and/or the decryption component 510

Figure 8:
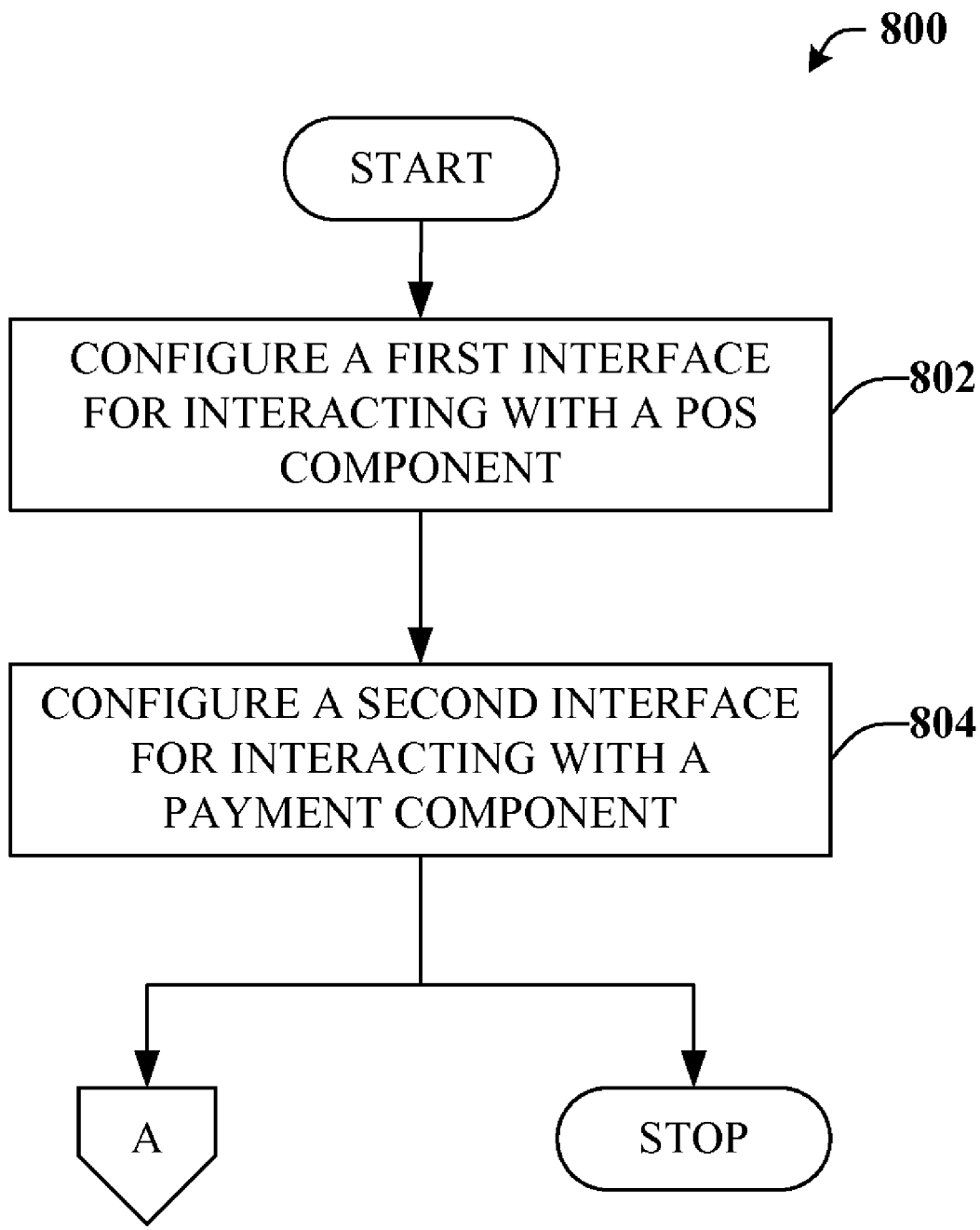
FIG. 8 is an exemplary flow chart of procedures defining a method for configuring interfaces.
Figure 9:
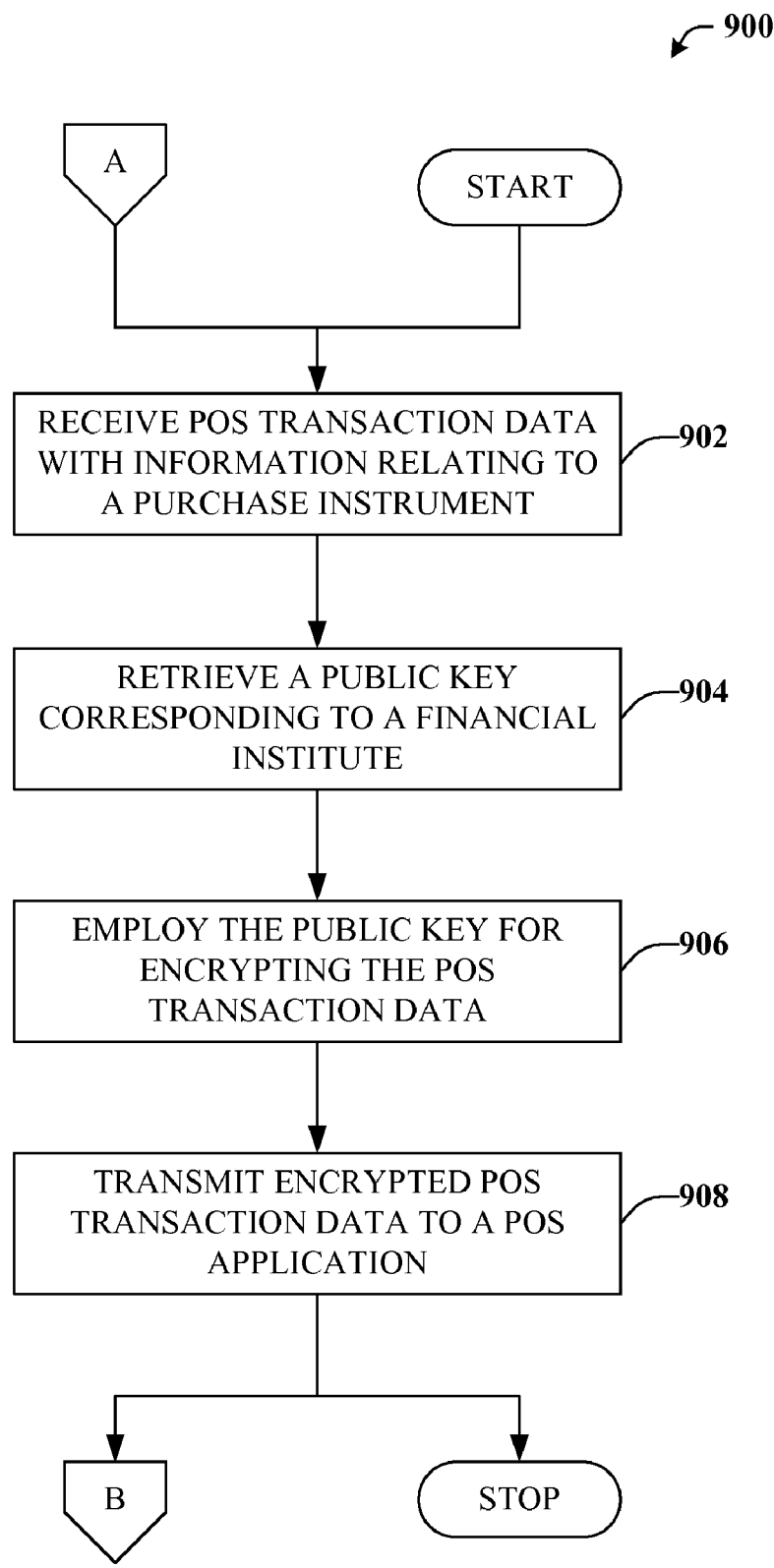
FIG. 9 depicts an exemplary flow chart of procedures defining a method for intercepting and encrypting information associated with a payment instrument before it is transmitted to a POS application.
Figure 10:
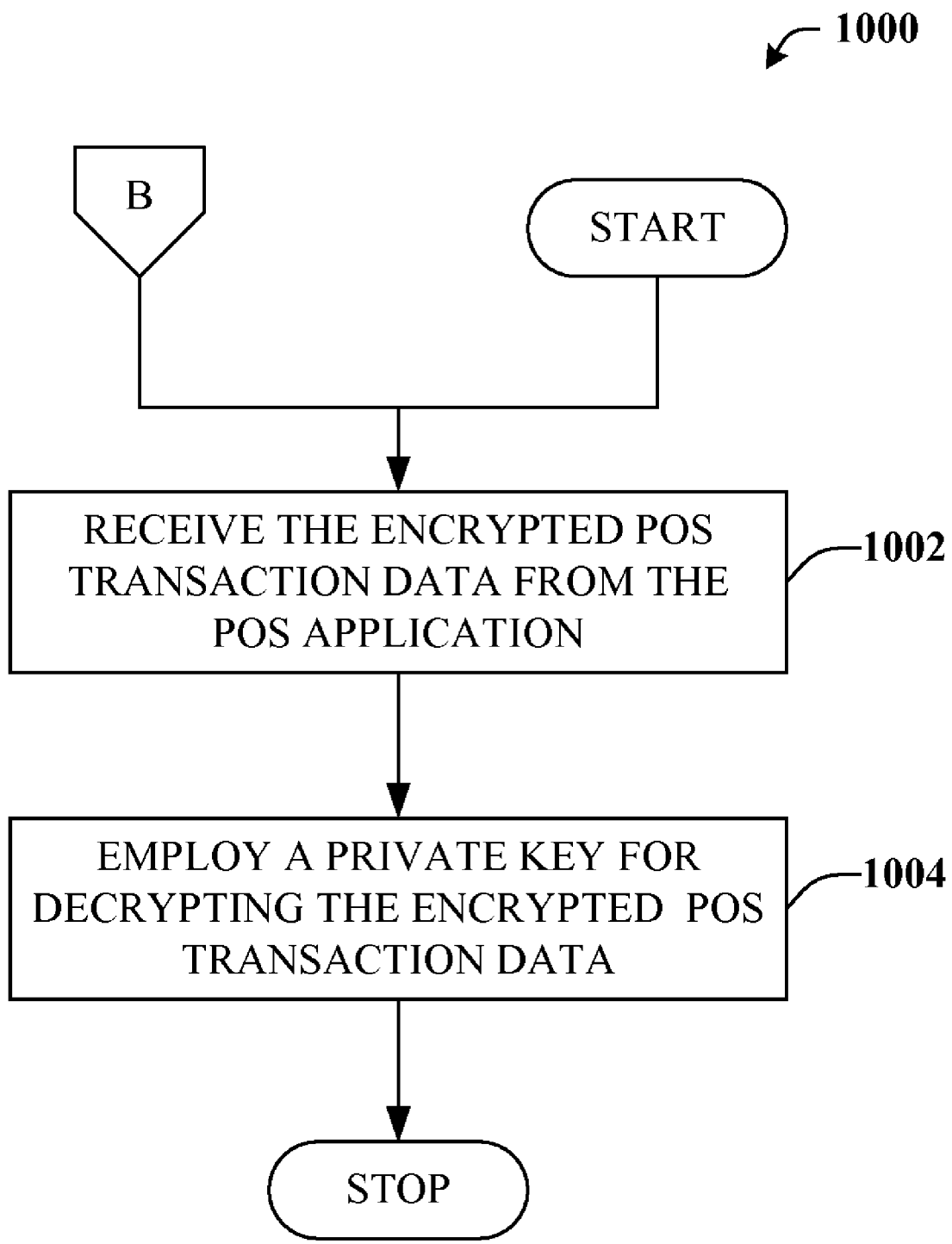
FIG. 10 illustrates an exemplary flow chart of procedures defining a method for intercepting and decrypting transaction data after the transaction data has traversed a POS application.

FIGS. 8, 9 and 10 illustrate process flow diagrams of computer-implemented methods. While, for purposes of simplicity of explanation, the one or more methods shown herein, e.g., in the form of a flow chart, are shown and described as a series of acts, it is to be understood and appreciated that the subject invention is not limited by the order of acts, as some acts may, in accordance with the claimed subject matter, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Referring now to FIG. 8, an exemplary flow chart of procedures defining a method 800 for configuring interfaces is illustrated. At reference numeral 802 a first interface can be configured for interacting with a POS component. The POS component can be, e.g., a POS input device such as a MSR device, a MICR device, a PIN pad, an RFID transceiver, or the like. In addition, the POS component can be a POS object associated with the POS input device; or the POS component can be POS middleware. Regardless of the type of POS component, the first interface can be configured to interact with the POS component and, e.g., be operatively coupled to the POS component.

At reference numeral 804, a second interface can be configured for interacting with a payment component. The payment component can be, e.g., a payment processor, a payment object associated with the payment processor. In addition, the payment object can be payment middleware or the like. Accordingly, irrespective of the type of payment component at hand, the second interface can interact with the payment component.

Turning now to FIG. 9, an exemplary flow chart of procedures defining a method for intercepting and encrypting information associated with a payment instrument before it is transmitted to a POS application is depicted. Generally, at reference numeral 902, transaction data with information relating to a purchase instrument can be received. The purchase instrument can be, e.g., a credit card, a debit card, a check or other negotiable instrument, a contactless card or other device with an RFID transponder, etc. It is to be appreciated that the transaction data can be received by the first interface (described supra in connection with FIG. 8) at substantially any POS component (also described supra in connection with FIG. 8).

At reference numeral 904, a public key corresponding to a financial institution can be retrieved. The public key can reside in a data store and accessed based upon information associated with a purchase instrument. Additionally or alternatively, the public key can be retrieved from the financial institution during a transaction, e.g., if the public key is not already in the data store, the public key needs to be updated, or the like. At reference numeral 906, the public key can be employed for encrypting the point-of-sale transaction data obtained from the payment instrument, e.g., in accordance with a PKI arrangement. At reference numeral 908, the encrypted POS transaction data can be transmitted to a POS application (or another application)

Turning now to FIG. 10, an exemplary flow chart of procedures defining a method for intercepting and decrypting transaction data after the transaction data has traversed a POS application is illustrated. At reference numeral 1002, encrypted POS transaction data can be received from a POS application. For example, the POS transaction data can be received and encrypted prior to exposure to any application on a point-of-sale front-end. At reference numeral 1004, a private key can be employed for decrypting the encrypted POS transaction data. The private key can be associated with, e.g., a public key employed for encryption at the point-of-sale front-end (e.g., a key pair) in accordance with a PKI arrangement.

FIGS. 11A-11E illustrate various arrangements for end-to-end processing of POS transaction, and can be referenced together simultaneously. The assorted components are intended to reflect at least one particular aspect, but it is to be appreciated other arrangements are possible and contemplated to be within the scope and spirit of the claimed subject matter. For example, FIGS. 11A-11E illustrate an MSR device 1102 as the primary input device for the sake of easy of understanding and consistent reference, but it should be understood that other input devices could be utilized as well. Moreover, the remaining components could exist in various other embodiments as well.

Figure 11A:
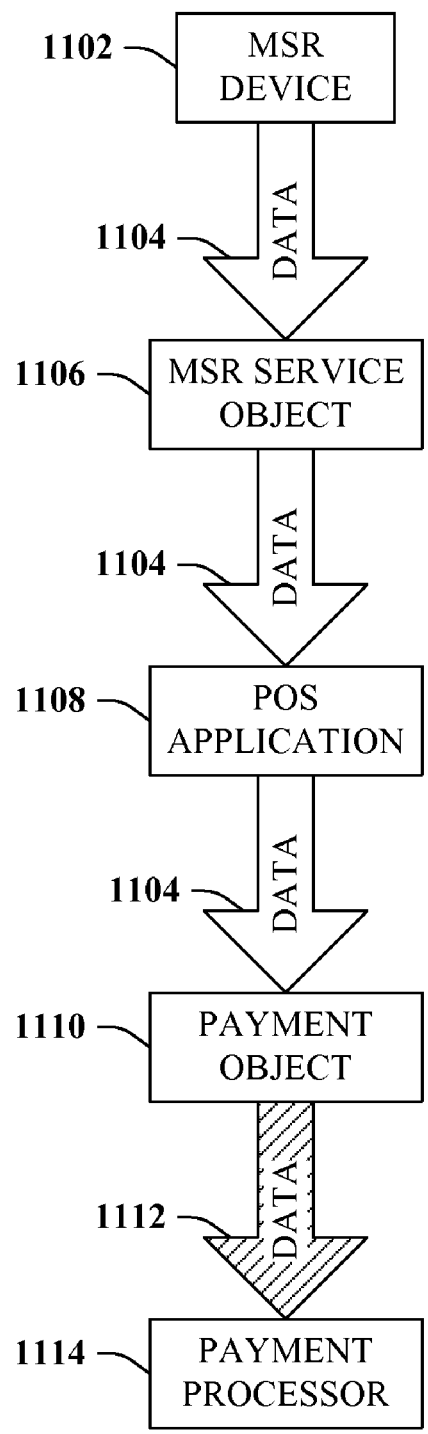
FIGS. 11A-11E illustrate various arrangements for end-to-end processing of POS transaction.

FIG. 11A depicts aspects of a conventional POS transaction. An MSR device 1102, e.g., at a point-of-sale location can obtain data 1104 (e.g., by reading a magnetic stripe of a credit card for instance). The MSR device 1102 can then pass the data 1104 read from the magnetic stripe to an associated service object 1106. The service object 1106 can decode the raw data 1104 and forward the data 1104 to a POS application 1108. The POS application 1108 can send a payment request along with the data 1104 to the payment object 1110 (or in some cases, although not specifically depicted, directly to a payment processor 1114). Upon receipt of the information from the POS application 1108, the payment object 1110 can transmit a request to the payment processor 1114 and/or forward the data 1112 to the payment processor 1114. It is to be appreciated that data 1112 can be substantially similar to data 1104, but data 1112 may or may not be encrypted depending upon, e.g., a configuration of the payment processor 1114 back-end.

Figure 11B:
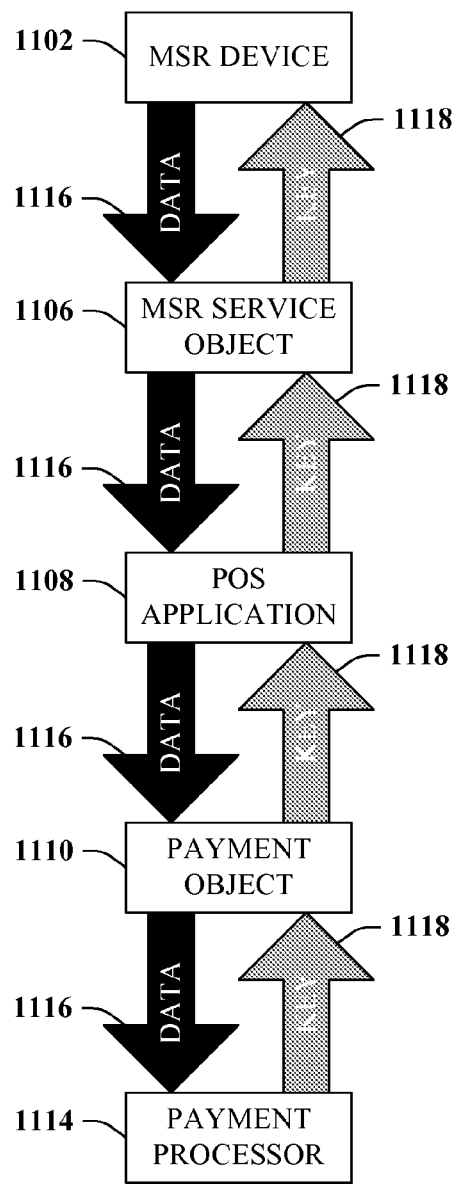

FIG. 11B illustrates an arrangement in accordance with one aspect of the claimed subject matter. In particular, the conventional arrangement described in FIG. 11A can be modified as described herein in order to pass a public key 1118 from the payment processor 1114 to a point-of-sale front-end, such as to the MSR device 1102 itself. Accordingly, sensitive transaction data such as data obtained from the payment instrument can be encrypted as early as is feasible. In particular, the POS application 1108 (or another application running on front-end hardware, etc.) will not have access to this information in an unencrypted form. As depicted, only encrypted data 1116 passes to the remaining components (e.g., 1106, 1108, 1110 . . . ) to the payment processor 1114.

Figure 11C:
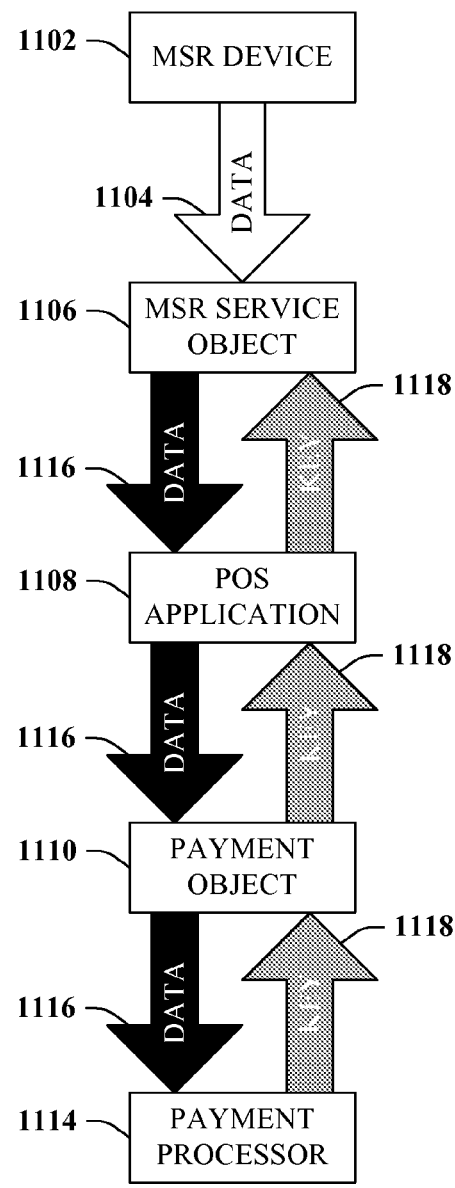

FIG. 11C shows one aspect of the claimed subject matter in which the encryption of transaction data is accomplished at the MSR service object 1106 rather than the MSR device 1102. For example, this aspect can be employed in cases where the MSR device 1102 is not easily adaptable to provide for encryption. The public key 1118 can be transmitted from the payment processor 1114 to the MSR service object 1106 where data 1104 can be encrypted. Thus, encrypted data 1116 can be delivered to the POS application 1108, then on to the payment object 1110 and finally to the payment processor 1114.

Figure 11D:
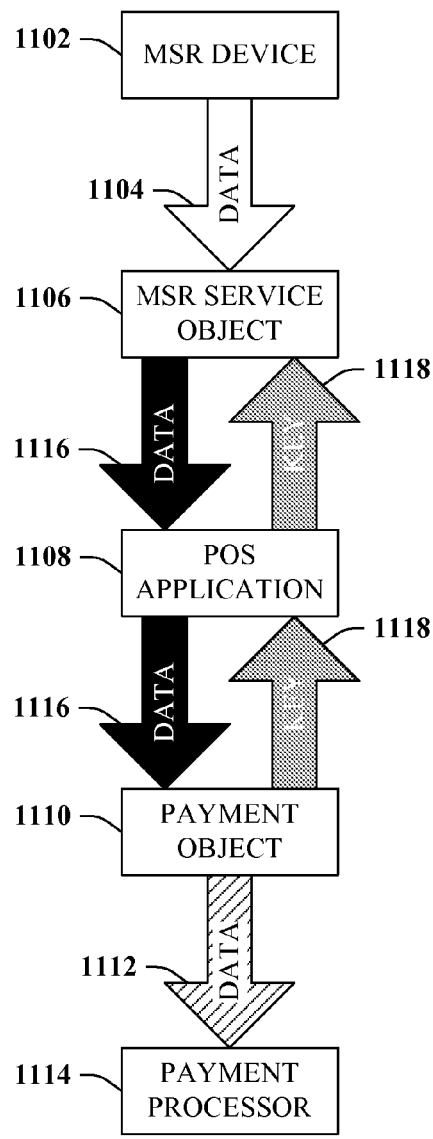

FIG. 11D depicts one aspect of the claimed subject matter in which the decryption performed at the payment object 1110 rather than at the payment processor 1114. It is to be understood that although the encryption is depicted to occur at the MSR service object 1106, the encryption operations could also occur at the MSR device 1102 as described supra, in connection with FIG. 11B. Accordingly, although not shown, public key 1118 could also be transmitted to the MSR device 1102, and, in such a case, the data 1104 shown as passing to MSR service object 1106 could be encrypted data 1116 instead. Regardless, the POS application 1108 is in receipt only of encrypted data 1116, which is forwarded to the payment object 1110 where encrypted data 1116 can be decrypted as detailed herein. Thus, data 1112 (which may or may not be decrypted, e.g., in accordance with a configuration employed at the payment back-end) can be transmitted to the payment processor 1114.

Figure 11E:
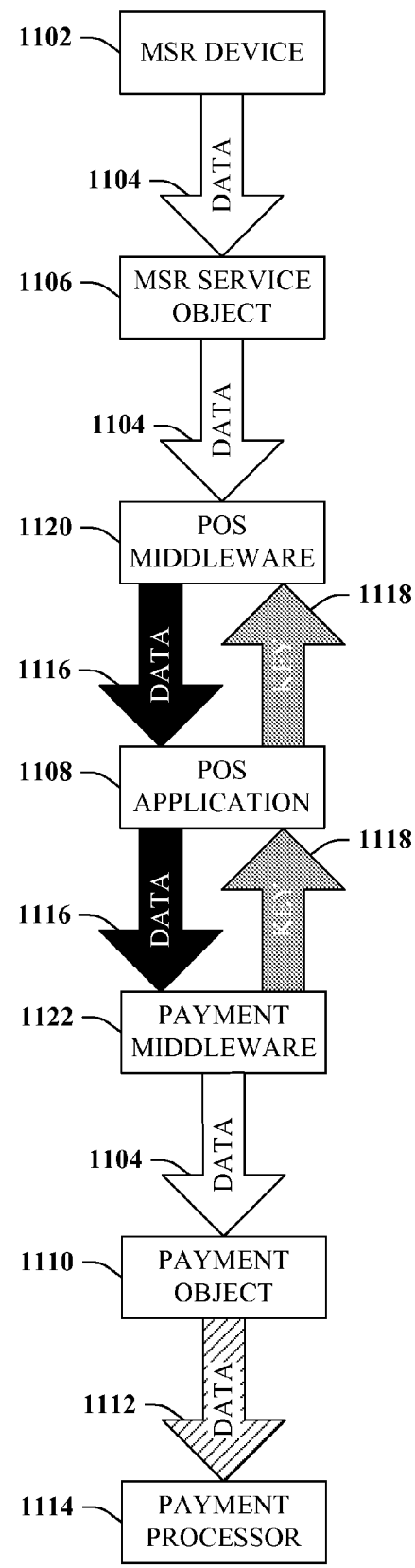

FIG. 11E illustrates an aspect of the claimed subject matter wherein at least one of the front-end or the back-end is not equipped to easily achieve the encryption/decryption described herein. In particular, if neither the hardware (e.g., the MSR device 1102) nor the software (e.g., MSR service object 1106) is able to support encryption, or if such an alteration is simply less convenient for the front-end than to utilize middleware, then POS middleware 1120 can be employed to receive the public key 1118 and/or encrypt the data 1104. Likewise, should the back-end not be organized to handle appropriate decryption at either the hardware level or the software level; or simply if the use of middleware would represent a more favorable back-end solution, payment middleware 1122 can be utilized to decrypt the data 1116. Once decrypted, the data 1104 can be delivered to the payment object 1110, which can then pass to the payment processor 1114 in the form of data 1112, which may or may not be encrypted according to some other protocol. It is to be appreciated that Should we stress here that 1106, 1110, 1120 and 1122 run on the POS system as external modules of 1108?

Figure 12:
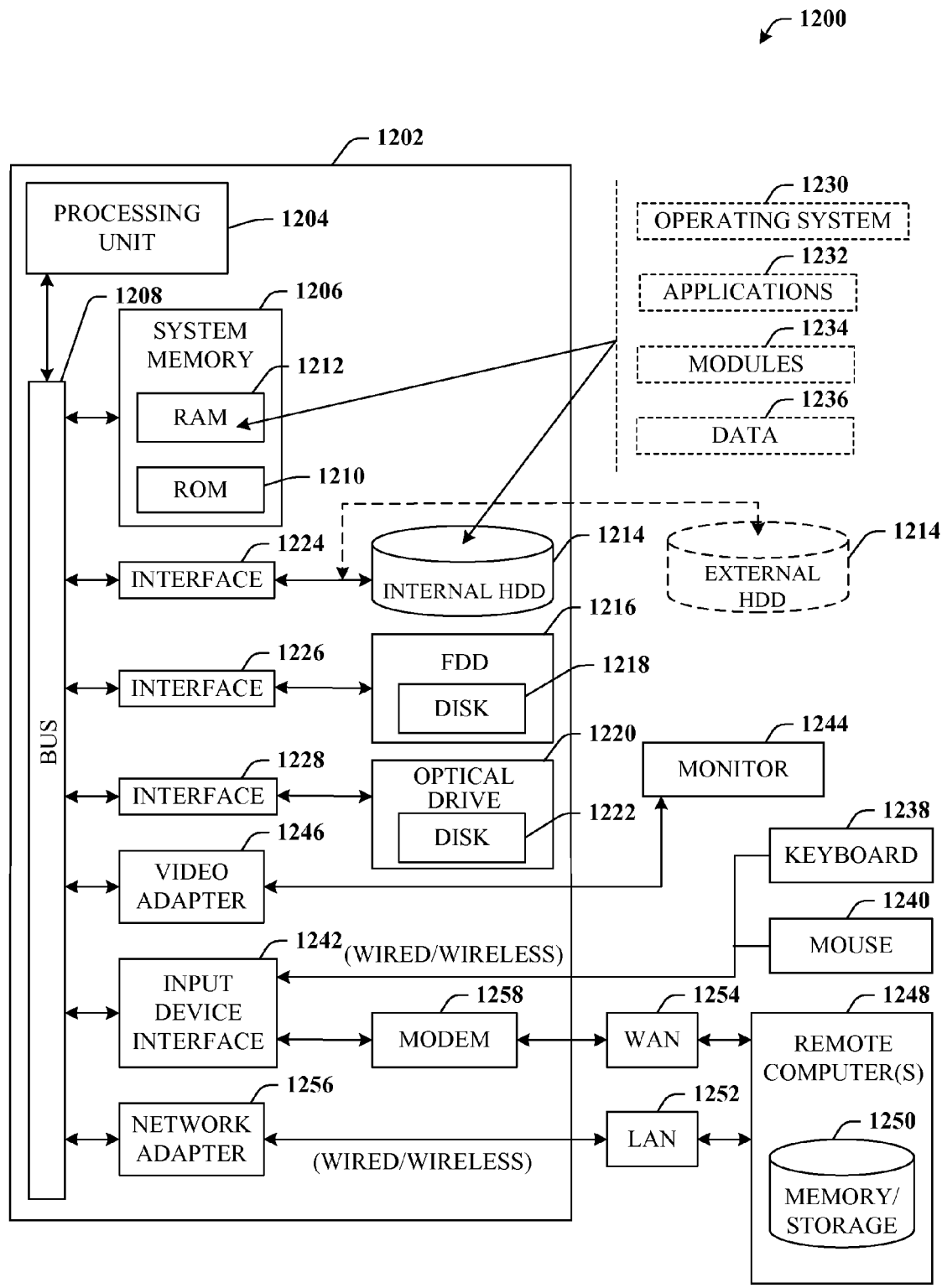
FIG. 12 illustrates a block diagram of a computer operable to execute the disclosed architecture.

Referring now to FIG. 12, there is illustrated a block diagram of an exemplary computer system operable to execute the disclosed architecture. In order to provide additional context for various aspects of the claimed subject matter, FIG. 12 and the following discussion are intended to provide a brief, general description of a suitable computing environment 1200 in which the various aspects of the claimed subject matter can be implemented. For example, various components of the systems and/or aspects thereof described supra can be implemented by way of the system 1200. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the claimed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the claimed subject matter.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the claimed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 12BaseT wired Ethernet networks used in many offices.

Figure 13:
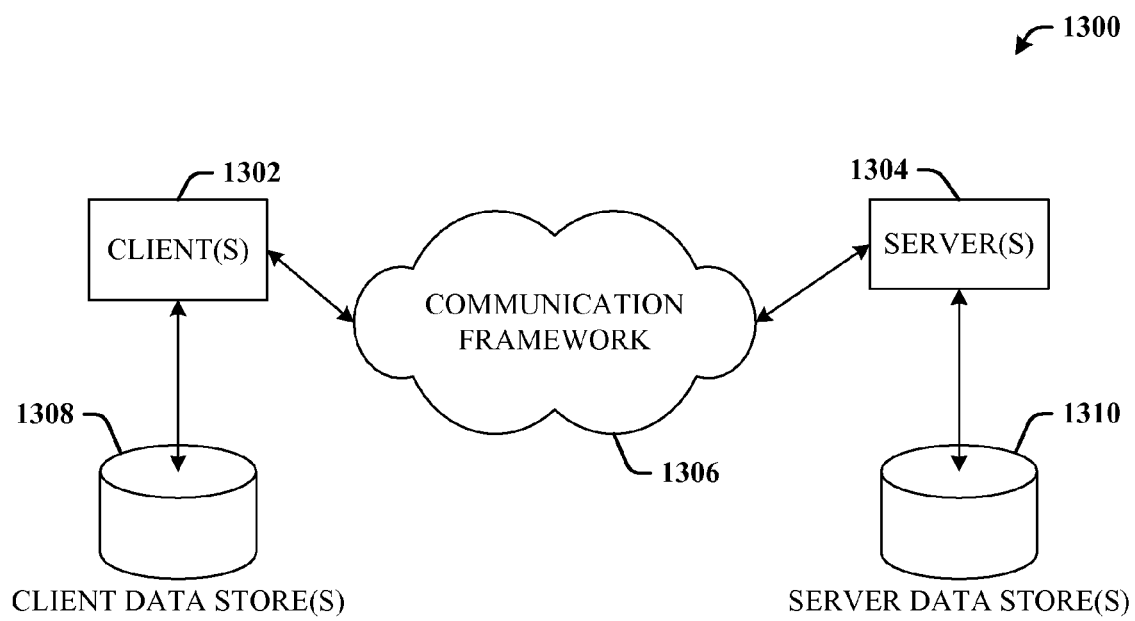
FIG. 13 illustrates a schematic block diagram of an exemplary computing environment.

Referring now to FIG. 13, there is illustrated a schematic block diagram of an exemplary computer compilation system operable to execute the disclosed architecture. The system 1300 includes one or more client(s) 1302. The client(s) 1302 can be hardware such as a digital camera with computer interface support and/or software (e.g., threads, processes, computing devices). The client(s) 1302 can house cookie(s) and/or associated contextual information by employing the claimed subject matter, for example.

The system 1300 also includes one or more server(s) 1304. The server(s) 1304 can also be hardware and/or software (e.g., threads, processes, computing devices). The servers 1304 can house threads to perform transformations by employing the claimed subject matter, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A back-end system configured to facilitate a secure transaction processing environment, comprising:
   a processor;
   a back-end interface configured to:
      attach to a payment component;
      define a cryptographic algorithm implementable by a front-end Point-of-Sale (POS) component; and
      transmit cryptographic information, which includes the cryptographic algorithm, to the front-end POS component in response to a request from the POS component prior to a transaction at the POS component, the POS component being located at a front-end device;
   a decryption component configured to decrypt data received from the front-end POS component and that is encrypted according to the cryptographic information; and
   a computer storage medium storing instructions that, when executed by the processor, cause the processor to implement at least one of the back-end interface or the decryption component.

2. The system of claim 1, wherein the payment component is payment middleware.

3. The system of claim 1, wherein the payment component is at least one of a payment object or a combination of a payment object and payment middleware.

4. The system of claim 1, wherein the payment component is a payment processor.

5. The system of claim 1, wherein the cryptographic information includes a public key.

6. The system of claim 1, wherein the decryption component is configured to employ a private key to decrypt the data.

7. The system of claim 1, wherein the back-end interface is configured to output decrypted data associated with a payment instrument.

8. A method for limiting access to unencrypted payment instrument information, comprising:
   defining a cryptographic algorithm that is provided to a Point-of-Sale (POS) device in response to a request from the POS device prior to a transaction at the POS device, the POS device being located at a POS front-end;
   receiving POS transaction data encrypted according to the cryptographic algorithm and comprising information relating to a payment instrument;
   retrieving a public key corresponding to a financial institution associated with the payment instrument; and
   decrypting the POS transaction data.

9. The method of claim 8, further comprising:
   employing a private key to decrypt the POS transaction data.

10. The method of claim 9, further comprising at least one of the following acts:
    configuring an interface configured to interface with a POS component or configuring an interface configured to interact with a payment component.

11. A computer-readable storage medium configured to facilitate limiting access to unencrypted payment instrument information, comprising:
    computer-readable instructions, the computer-readable instructions including instructions for causing at least one processor to perform operations comprising:
    defining a cryptographic algorithm;
    communicating the cryptographic algorithm to a Point-of-Sale (POS) device in response to a request from the POS device prior to a transaction at the POS device, the POS device being included in a front-end component;
    receiving POS transaction data encrypted according to the cryptographic algorithm and including information relating to a payment instrument; and
    decrypting the POS transaction data.

12. The computer-readable storage medium of claim 11, wherein the computer-readable instructions further cause the at least one processor to retrieve a public key corresponding to a financial institution associated with the payment instrument.

13. The computer-readable storage medium of claim 11, wherein the computer-readable instructions further cause the at least one processor to employ a private key to decrypt the POS transaction data.

14. The computer-readable storage medium of claim 13, wherein the computer-readable instructions further cause the at least one processor to configure at least one of an interface configured to interface with a POS component or configuring an interface configured to interact with a payment component.

* * * * *